US012512531B2

(12) United States Patent
Ehrenberger et al.

(10) Patent No.: US 12,512,531 B2
(45) Date of Patent: Dec. 30, 2025

(54) METHOD FOR FLUIDICALLY CONNECTING FUNCTIONAL MODULES THAT ARE TEMPERATURE-CONTROLLED BY MEANS OF A FLUID, CORRESPONDINGLY TEMPERATURE-CONTROLLED FUNCTIONAL MODULES, AND ASSOCIATED CONNECTION DEVICE

(71) Applicant: Witzenmann GmbH, Pforzheim (DE)

(72) Inventors: David Ehrenberger, Königsbach-Stein (DE); Maximilian Ritter, Höfen an der Enz (DE); Jörg Ludwig, Pfrozheim (DE); Alexander Leippi, Pforzheim (DE)

(73) Assignee: Witzenmann GmbH, Pforzheim (DE)

( * ) Notice: Subject to any disclaimer, the term of this patent is extended or adjusted under 35 U.S.C. 154(b) by 258 days.

(21) Appl. No.: 17/963,300

(22) Filed: Oct. 11, 2022

(65) Prior Publication Data

US 2023/0111428 A1   Apr. 13, 2023

(30) Foreign Application Priority Data

Oct. 12, 2021   (DE) .......................... 102021126429.4

(51) Int. Cl.
*F16L 51/02*   (2006.01)
*F16L 37/098*   (2006.01)
(Continued)

(52) U.S. Cl.
CPC ....... *H01M 10/6556* (2015.04); *F16L 37/098* (2013.01); *F16L 51/02* (2013.01); *H01M 10/625* (2015.04)

(58) Field of Classification Search
CPC ......... F16L 27/11; F16L 51/025; F16L 51/03; F16L 3/237
See application file for complete search history.

(56) References Cited

U.S. PATENT DOCUMENTS 6,508,681 B1 * 1/2003 Neisen .................... F16L 27/11
440/89 R
10,663,353 B2 * 5/2020 Newlin .................... F16L 27/11
(Continued)

FOREIGN PATENT DOCUMENTS

| DE | 102012009492 | 11/2013 |
|---|---|---|
| DE | 102012222623 | 6/2014 |

(Continued)

*Primary Examiner* — Matthew Troutman
*Assistant Examiner* — Fannie Kee
(74) *Attorney, Agent, or Firm* — Volpe Koenig

(57) ABSTRACT

A method for fluidically connecting functional modules that are temperature-controlled by a fluid, preferably battery modules, including a) providing the functional modules with at least one line port for directing the fluid in and/or out, at least two functional modules being arranged at a mutual spacing so the line ports are substantially exactly opposite each other and aligned along a first axis and open into a region between the modules, c) incorporating a preassembled connection assembly in the region, the connection assembly having fluid line(s) for feeding and/or discharging the fluid, and at least two fluidic connector pieces which branch off from the fluid line(s) such that the connector pieces are aligned with the line ports along the first axis, and d) modifying a spacing between the connector pieces and/or a length thereof along the first axis such that the connector pieces each fluidically contact one of the line ports.

23 Claims, 9 Drawing Sheets

(51) Int. Cl.
  *H01M 10/625* (2014.01)
  *H01M 10/6556* (2014.01)

(56) References Cited

U.S. PATENT DOCUMENTS

| | | | | |
|---|---|---|---|---|
| 11,656,130 | B2* | 5/2023 | Patil | F16L 3/237 |
| | | | | 374/208 |
| 2018/0202591 | A1* | 7/2018 | Tajiri | F16L 27/11 |
| 2019/0226605 | A1* | 7/2019 | Olofsson | F16L 3/237 |
| 2021/0172804 | A1* | 6/2021 | Patil | F16L 3/237 |

FOREIGN PATENT DOCUMENTS

| | | | | |
|---|---|---|---|---|
| DE | 102014200978 | | 7/2015 | |
| DE | 102018102927 | | 8/2019 | |
| EP | 2239487 A1 * | | 10/2010 | F16L 3/237 |
| EP | 3225526 A1 * | | 10/2017 | F16L 3/237 |
| EP | 3614094 | | 2/2020 | |
| JP | 2012180876 | | 9/2012 | |
| WO | WO-2008037023 A1 * | | 4/2008 | F16L 3/237 |
| WO | 2012117697 | | 9/2012 | |
| WO | WO-2013058413 A1 * | | 4/2013 | F16L 3/237 |
| WO | 2019046012 | | 3/2019 | |
| WO | WO-2019243779 A1 * | | 12/2019 | F16L 3/237 |

\* cited by examiner

METHOD FOR FLUIDICALLY CONNECTING FUNCTIONAL MODULES THAT ARE TEMPERATURE-CONTROLLED BY MEANS OF A FLUID, CORRESPONDINGLY TEMPERATURE-CONTROLLED FUNCTIONAL MODULES, AND ASSOCIATED CONNECTION DEVICE

INCORPORATION BY REFERENCE

The following documents are incorporated herein by reference as if fully set forth: German Patent Application No. 10 2021 126 429.4, filed Oct. 12, 2021

TECHNICAL FIELD

A first aspect of the invention relates to a method for fluidically connecting functional modules that are temperature-controlled by means of a fluid, in particular battery modules.

A second aspect of the invention relates to a connection device for fluidically connecting functional modules that are temperature-controlled by means of a fluid, in particular battery modules, said functional modules each having at least one line port for directing the fluid in and/or out.

A third aspect of the invention relates to a connection comprising at least one connection device according to the second aspect of the invention and at least one fluid line for feeding and/or discharging the fluid, said fluid line by way of the carrier module of the connection device being fluidically connected to the connector pieces.

A fourth aspect of the invention relates to functional modules that are temperature-controlled by means of a fluid, in particular battery modules, said functional modules each having at least one line port for directing the fluid in and/or out, having a connection assembly according to the third aspect of the invention.

BACKGROUND

Especially in battery-operated motor vehicles there is the requirement for cell modules (battery modules, generally functional modules) assembled in the battery to be supplied with a temperature-control fluid by way of a central supply duct, and for this temperature-control fluid to be discharged again. The predefined tight installation space here typically does not permit an integral fluid line assembly to be assembled in the region between the functional modules.

In order for this to be addressed it is provided in the prior art that individual line segments are assembled on the line ports of the functional modules. As a result, this necessitates that the (main) fluid lines are divided into segments. After the modules, which in each case have preassembled line segments, have been inserted, these line segments typically have to be connected in a complex manner to the main fluid lines. This creates a multiplicity of connection points which in each case already upon assembly and when in operation have a (statistical) failure probability of greater than zero. As the number of installed connections increases, the failure probability of the entire system increases because the failure of one connection already leads to the failure of the complete system.

In the case of an increase in the number of connection points, the failure probability of the entire system increases already at the start of the product life cycle, purely as a result of the statistical failure probability of each individual connection.

SUMMARY

The invention is based on the object of reducing the number of connection points and thus the failure probability.

It is furthermore an object of the invention to optimize the assembling of the fluid lines in terms of the accessibility to the operator and the tools used by the latter. This also applies to mechanized assembling. The objective here is preferably assembling in the vertical Z-direction (e.g. in a vehicle coordinate system) with subsequent, optionally tool-assisted, contacting of the individual battery modules (functional modules) and securing/fixing of the fluid lines in the assembled and connected state.

The object mentioned is achieved according to the invention by a method having one or more of the features disclosed herein, by a connection device having the one or more of the features disclosed herein, by a connection assembly having the one or more of the features disclosed herein, as well as by functional modules that are temperature-controlled by a fluid and having the one or more of the features disclosed herein.

A method according to the invention for fluidically connecting functional modules that are temperature-controlled by means of a fluid, in particular battery modules, comprises the following steps:

a) providing the functional modules, said functional modules each having at least one line port for directing the fluid in and/or out;

b) disposing at least two functional modules at a mutual spacing in such a manner that the respective line ports are disposed so as to be substantially exactly opposite each other and aligned along a first axis and open into a region between the functional modules;

c) incorporating an at least partially flexible, preassembled connection assembly in the region between the functional modules, said connection assembly having at least one fluid line for feeding and/or discharging the fluid, and at least two fluidic connector pieces which branch off from the fluid line or each branch off from one of the fluid lines in such a manner that the connector pieces are in each case aligned with one of the line ports along the first axis; and d) modifying a spacing between the connector pieces and/or a length of the connector pieces along the first axis such that the connector pieces each fluidically contact one of the line ports, said connector pieces potentially being flexibly configured, for example as bellows or a corrugated hose.

A connection device according to the invention for fluidically connecting functional modules that are temperature-controlled by means of a fluid, in particular battery modules, said functional modules each having at least one line port for directing the fluid in and/or out, comprises:

a carrier module for mounting at least one fluid line for feeding and/or discharging the fluid;

at least two fluidic connector pieces which by way of the carrier module are fluidically connectable, or connected, to the fluid line or in each case one of the fluid lines;

a kinematic installation which is disposed on the carrier module, a modification of a spacing between the connector pieces and/or of a length of the connector pieces being able to be effected by activating said kinematic installation, so as to fluidically connect the connector pieces to in each case one of the line ports, said connector pieces again potentially being flexibly configured, for example as bellows or corrugated hose.

A connection assembly according to the invention comprises at least one connection device according to the invention and at least one fluid line for feeding and/or discharging the fluid, said fluid line by way of the carrier module being fluidically connected to the connector pieces.

Functional modules according to the invention that are temperature-controlled by means of a fluid, in particular battery modules, said functional modules each having at least one line port for directing the fluid in and/or out, comprise a connection assembly according to the invention, at least two functional modules being disposed at a mutual spacing such that the respective line ports are disposed so as to be substantially exactly opposite each other and aligned along a first axis and open into a region between the functional modules, the line ports by means of the connection device comprised by the connection assembly being fluidically connected to the fluid line.

When "battery modules" are referred to hereunder, said battery modules in an exemplary manner represent general functional modules, and the invention is fundamentally not limited to the use with or in battery modules, although this does represent a preferable use.

All fluidic components in the context of the invention are preferably formed from a metallic material, for example (stainless) steel, so as to achieve a sufficiently fluid-tight metallic pipework for contacting and supplying functional modules, preferably battery modules, with a temperature-control fluid for temperature-controlling the modules.

Moreover, a purely metallic concept is preferable, at least in terms of the pipework, so as to in the event of the battery (of the functional modules) and the fluid lines being impinged with fire offer an increased resistance in relation to failure due to thermal influence.

In particular, this pipework in comparison to the prior art has a reduced number of interfaces which are to be joined during assembling and is at least in part of a flexible design, for example by intervening corrugated portions, so as to compensate for tolerances in terms of shape and position. In the course of corresponding refinements of the invention, it is furthermore an intrinsic property of the pipework that the latter, by elastic and plastic deformation at least in sub-portions, is converted from a delivery state, in which said pipework can be positioned during assembling, to an assembled state. The deformations required for this purpose are preferably enabled by regions with comparatively low stiffnesses (in terms of geometry and/or material) in the pipework per se, and most preferably by incorporating geometric corrugations in specific regions. The safeguard in relation to inadvertent dismantling is preferably ensured inter alia by plastic moldings formed in the region of the connector pieces.

In the course of a corresponding design embodiment of the invention, or of the connection assembly, respectively, it is furthermore proposed that for assembling a carrier module, preferably of a modular construction, is introduced, which carrier module positions and mounts the fluid lines relative to the fluid connector ports (line ports) of the functional modules or battery modules and, by means of the connector pieces, preferably contacts in a fluid-tight manner and in the assembled position secures the connector ports on both sides of the carrier module by a kinematic installation that is driven from "above", i.e. in the positive Z-direction. The connector pieces here are elastically and plastically deformable, depending on the embodiment. This is preferably achieved by a corrugated region, or a completely corrugated design embodiment, most preferably by way of a metallic corrugated design embodiment, of the connector pieces.

A further variant of design embodiment provides that the fluid line(s) is split into a plurality of (parallel) strands and is in each case provided with flexible (line) elements or corresponding line portions. If a branch, preferably in the form of a casting or a formed extrusion, is incorporated in each of these individual strands, the contacting of the connector ports is thus possible by a lateral displacement of the individual strands (transversely to the Z-axis).

The carrier module mentioned can be formed from two congruent (carrier module) basic parts and a drive or gear mechanism, or comprise these component parts, respectively. The carrier module basic parts are preferably produced by a casting method, most preferably injection-molding, and plugged into one another. The preferred material for producing the carrier module basic parts is a plastics material, most preferably a polyamide, without being limited thereto. A plurality of functions are preferably embodied by the composite of the two carrier module basic parts:

The basic parts, on the side thereof that faces the functional modules or is to face the functional modules, can have an introduction ramp having a guide (guide rail) and latching position for the connector ports (on the batteries or the modules, respectively) (line ports). This feature serves for positioning and fixing the (assembly) carrier module relative to the battery-proximal connector ports when assembling in the negative Z-direction.

The basic parts preferably have functional faces for mutual guidance in one another (plug fitting), said functional faces potentially being disposed and embodied such that a linear guide is configured between two basic parts that are plugged into each other. This linear guide preferably serves for guiding the assembly bellows or connector pieces, respectively, when contacting the connector ports.

Depending on the variant of design embodiment, clearances which (optionally in an elastically pretensioned manner) enclose in a form-fitting manner the fluid lines or fluid line components in order for the fluid lines to be mounted can be provided in the carrier module basic parts.

In order for the connection assembly to be assembled by forming, the module carrier basic parts can possess a drive which is preferably composed of a toothing embodied on the linear guide and of a driving gear wheel, said gear wheel being able to be driven by a tool. The gear wheel is preferably fastened to a central fluid branch (branching element) by way of a form-fitting snap-fit connection, said fluid branch in one design embodiment potentially being configured as a branching element disposed between the connector pieces and/or the basic parts, said branching element fluidically connecting the connector pieces to one another. This branching element can be produced by a primary forming method, most preferably by a casting method. The driving action (by way of a tool) can take place by way of a penetration in the fluid branch (branching element).

Moreover, the gear wheel can have functional faces, preferably in the form of corrugation shoulders which are operatively connected to functional faces on the basic parts and by way of the pair of functional faces thus formed mount the pipework and permit a translatory movement in the Y-direction during assembling.

One variant of the drive is distinguished by the use of a further gear wheel and a layshaft which places the axle of the tool drive outside the fluid branch. Additionally, this variant has the advantage of converting torque into a path (gear mechanism) such that a lower torque has to be applied for assembling the connector pieces. However, the invention is not limited thereto; a reduced path in association with an increased torque can offer a temporal advantage during assembling, in particular when mechanically assisted assembling is used. The gearing ratio of the converter (gear mechanism) can be correspondingly adapted.

In one variant according to the invention, the use of a hypoid gear mechanism is also possible. By mutually tilting the axles of the gear wheels, the drive action by the tool here can also be performed in tight installation space conditions outside the envelope of the central branching part.

The drive, or the kinematic installation, respectively, in one preferred design embodiment of the invention, which preferably comprises parallel fluid lines, is embodied so as to be cam-controlled, preferably by way of a cam shaft, most preferably a double cam shaft. The cams serve for displacing the fluid lines, in particular in the Y-direction; said cams, optionally in the region of the end sides thereof, here encompass parts of the fluid lines and as a result mount these parts in the Z-direction.

The carrier module basic parts can furthermore be equipped with functional faces for receiving in a form-fitting manner further lines or pipes by snap-fit connections. These functional faces can be divided into sub-faces on the alternatingly disposed basic parts so as to permit the further lines or pipes to be received only by said basic parts when joined and correctly assembled, for example by snap-fitting the mentioned further line(s). In this way, safeguarding/blocking in particular in relation to inadvertent dismantling can also be achieved.

If support structures having end-proximal functional faces for mounting the entire module (connection assembly) are moreover provided on the module carrier basic parts, additional holders or fixings can be dispensed with as long as the functional faces of the basic parts interact with functional faces in the environment, e.g. on the functional modules. A form-fitting snap-fit connection or a securing mechanism with a wedge (screw) can be added to this function.

Another design embodiment provides that the module carrier basic parts are equipped with functional faces which, conjointly with complementary faces on a wedge, which is preferably moved, or movable, in the negative Z-direction, form pairs of functional faces, as a result of which the contacting procedure of the line ports is carried out by the connector pieces in that the latter during the movement of the wedge are displaced in a defined manner toward the sides. Supporting the module carrier basic parts in the Z-direction during assembling is advantageous.

In the context of the invention it is furthermore possible for the assembly of the connector pieces to be carried out by designing the latter as bellows that are elastically pretensioned (by pressure). In order for an increased number of corrugations to be installed, a sleeve (sleeve element) which lies in the bellows and at one end is connected to the bellows in a materially integral manner and provides a cylindrical sealing face including an introduction ramp for the mating part of the connection (line port) is preferably proposed. Moreover, an additional spring element which presses the connector pieces onto the respective line port can be incorporated in order for the mechanical pretension to be increased. The spring element is embodied as a leaf spring, for example, but can also be embodied as a coil spring which is located within the bellows and can be supported in relation to the cast branching part (branching element). A spring element located outside the bellows is also not precluded here.

Fixing of the pipework in the mechanically pretensioned state is particularly advantageous and can be implemented in a particularly simple manner, for example by way of snap-fit elements which are attached to the ends of guide elements.

A further variant of design embodiment provides that the (basic) carrier module which remains in particular in the vehicle is dispensed with and the fluid lines per se are equipped with holders for mounting. In this variant, a special (gripping) tool can be provided for assembling, said (gripping) tool first optionally gripping the fluid line with connector pieces branching off from the latter from a magazine (supply container), thereafter compressing the flexible elements of the branches, i.e. the connector pieces, subsequently positioning the fluid line (including the compensation of tolerances by way of further flexible elements in the fluid line per se), then relaxing the flexible elements of the branches and additionally plastically forming the latter when contacting the line ports, subsequently permitting the connector pieces to rebound to a state which, except for inherent stresses and stresses remaining as a result of potential friction of sealing elements, is non-stressed, and finally fixing said holders in relation to the environment (e.g. in relation to the functional modules), for example by screw-fitting. The tool subsequently releases the pipework again.

Furthermore, the receptacle of the (flexible) connector pieces in the carrier module basic parts in the case of a corresponding design embodiment is an important aspect because the preferably form-fitting receptacle has to be overcome for the transmission of force for the plastic deformation of the connector pieces and overcoming the frictional resistances when joining the connector pieces. This function in a refinement of the invention, without being limited thereto, can be achieved by the following variants:

Snap-fit hooks: the receptacle in this case is formed by snap-fit hooks which provide a form-fit. This connection is established when assembling the module carrier basic parts in the Y-direction (transverse to the Z-direction) and subsequently elastically pretensioning the flexible element (connector piece). In order to prevent an overload on the flexible element, an internal sleeve (sleeve element) can be provided and embodied in such a manner that said internal sleeve can be supported in the central branching part (branching element) and destresses the flexible element.

Sliding insert: such a sliding seat can be embodied for receiving in a form-fitting manner an optionally molded end-proximal rim of the connector pieces in the Z-direction. When a plurality of parallel connector pieces are connected by way of the central branching element and the drive (the central gear wheel), it can be prevented that the rim slides out of the sliding insert.

Claw: moreover proposed is a variant which is distinguished by a rim configured on the connector pieces, said rim by way of an interference fit being joined in a mating contour and tilted in the direction of the joint. In the event of a load reversal, the optionally slotted rim is erected and interlocks in a form-fitting and friction-fitting (force-fitting) manner with the mating contour. The mating contour is preferably embodied in a plastics material, and the rim (like the entire connector piece) is preferably embodied so as to be metallic. If the rim is geometrically produced by a cutting process such as a stamping process, it is advantageous for the cutting burr to be oriented such that interlocking is supported and a particularly advantageous design embodiment thus results.

The invention in this way enables simplified assembling without having to cut the pipework into pieces, a reduced number of sealing points, the achievement of a metallic fluid line as well as the reduction of the required installation space.

The following design embodiments have proven to be particularly advantageous:

A first refinement of the method according to the invention provides that the connection assembly is incorporated in the region along a second axis, the latter being transverse to the first axis. The first axis is preferably the Y-axis already mentioned, and the second axis is preferably the Z-axis likewise already mentioned. The assembling can be simplified in this way.

A second refinement of the method according to the invention provides that for modifying the spacing and/or the length in step d) there is a spacing modification installation which is activated from outside the region, the activation including a translatory movement along a second axis, the latter being transverse to the first axis, or a rotating movement about a second axis, the latter being transverse to the first axis. Simplified assembling results yet again by virtue of the activation from outside the region.

A third refinement of the method according to the invention provides that in step d) the spacing between the connector pieces is changed in that d1) a cam-shaped element disposed between the connector pieces is rotated about the second axis between the connector pieces; or d2) a wedge-shaped element is inserted along the second axis between the connector pieces; or d3) a spacing-modifying gear assembly is activated. In all cases mentioned, the envisaged spacing modification can be achieved without great complexity.

A further refinement of the method according to the invention provides that in step d) the length of the connector pieces is modified in that d4) a length-modifying wedge-shaped element is inserted along the second axis into the region between the functional modules; or d5) a length-modifying gear assembly is activated; or d6) the connector pieces prior to step c) are first compressed and in step d) relaxed again, in particular by means of a corresponding gripping tool. In all cases mentioned, the envisaged length modification can likewise be achieved without great complexity.

It has proven particularly advantageous when, in the course of a specific design embodiment of the method according to the invention, in step d) the length of the connector pieces is plastically modified. An automatic safeguard of the established connection results in this way because the connector pieces do not rebound, or rebound only slightly. In a variant of this design embodiment however, the connector pieces can initially be deformed only elastically and thereafter elastically-plastically deformed in a second step.

Provided in yet another refinement of the method according to the invention for compressing the connector pieces and for incorporating the connection assembly is a tool which optionally grips the connection assembly, compresses the connector pieces, positions the connection assembly, preferably including a compensation of tolerances by way of flexible line elements in the connection assembly, then relaxes the connector pieces and additionally plastically forms the latter when contacting the line ports, thereafter permits the connector pieces to rebound to a state which, except for inherent stresses and the stresses remaining as a result of potential friction of sealing elements, is non-stressed, and finally optionally releases the connection assembly.

With the exception of the tool mentioned, such a design embodiment can practically make do without any additional components such as a carrier module or the like.

It has proven advantageous for the connector pieces in the refinement of the connection assembly according to the invention to be aligned along a first axis and the modification to be able to be effected along the first axis. The particular advantages of such a design embodiment have already been pointed out above in the context of the method.

In the refinement of the connection device according to the invention it is particularly advantageous for the first axis to be oriented substantially transversely to a direction of extent of the one fluid line. This has also already been pointed out above.

In a refinement of the connection device according to the invention it can moreover also be provided that the connector pieces are configured as flexible metal bellows having a corrugated portion or comprise such metal bellows, said metal bellows preferably being mechanically pretensioned, in particular by means of an additional spring element. Connector pieces of this type are particularly stable and promise a long service life of a correspondingly configured connection device.

In another refinement of the connection device according to the invention it can be provided that the connector pieces comprise a sleeve element which is configured and provided for a fluidic connection to a line port, in particular by the provision of an introduction ramp or an introduction radius. The fluidic properties of the connector pieces are improved in this way. Moreover, the sleeve element can contribute toward stabilizing the connection device.

A particular refinement of the connection device according to the invention provides that the carrier module has two basic parts which are movably connected to each other (e.g. plugged into each other) and in each case hold or receive one of the connector pieces and that a) the kinematic installation comprises a cam-shaped element which is disposed between the connector pieces and/or the basic parts, said element being mounted on the carrier module so as to be rotatable about a second axis such that the modification of the spacing between the connector pieces is able to be effected by way of a rotation of the element; or that b) the kinematic installation comprises a wedge-shaped element which is disposed between the connector pieces and/or the basic parts, said element being mounted on the carrier module so as to be movable along a second axis such that the modification of the spacing between the connector pieces is able to be effected by way of a movement of the element. The second axis mentioned here is preferably perpendicular to the first axis. It has already been pointed out that the first axis can be the Y-axis, and the second axis can be the Z-axis.

Yet another refinement of the connection device according to the invention provides that the (carrier module) basic parts each have at least one connector for a fluid line, said connector being fluidically connected to the respective connector piece. The basic parts mentioned particularly preferably have two connectors for a fluid line that are aligned along an axis, the connector piece in the manner of the letter "T" branching off laterally from said basic parts.

In a refinement of the connection device according to the invention it can moreover be provided that the carrier module has at least two basic parts which are movably connected to each other and in each case hold or receive one of the connector pieces, as well as a branching element which is disposed between the connector pieces and/or the basic parts, said branching element fluidically connecting the connector pieces to each other, and wherein the kinematic installation comprises a gear assembly, the modification of the length of the connector pieces being able to be effected by activating said gear assembly in that the basic parts are diverged. The branching element mentioned, which can be produced as a casting, here preferably serves as a support for the sleeve (sleeve element) mentioned above.

In the course of a preferred refinement of this design embodiment of the connection device according to the invention, the gear assembly can have at least one first gear wheel and at least one rack which engages with the first gear wheel, said first gear wheel being rotatable about a second axis, said second axis preferably being oriented perpendicular to the first axis while the rack is oriented so as to be parallel to the connector pieces. In this way, a length modification of the connector pieces can be easily effected by activating the first gear wheel.

In a corresponding refinement of the connection device according to the invention it can be provided that the gear assembly is able to be activated while penetrating the branching element.

Alternatively however, it can also be provided in a corresponding refinement of the connection device according to the invention that the gear assembly additionally has at least one second gear wheel, preferably on a layshaft, said second gear wheel engaging with the first gear wheel. In this way it can be avoided in particular that the branching element has to have an opening or a penetration for a tool for activating the gear assembly. Moreover, an easier activation, or an adapted length modification, respectively, can be effected by providing a corresponding gearing ratio.

A particularly advantageous design embodiment of the connection device according to the invention provides that the basic parts are equipped with functional faces for receiving in a form-fitting manner, in particular by snap-fit connections, further lines or pipes, said functional faces preferably being divided into sub-faces on the respective basic parts so as to permit the further lines or pipes to be received only by said basic parts when joined and correctly assembled. In this way, safeguarding/blocking in particular in relation to inadvertent dismantling can also be achieved.

Another particularly advantageous design embodiment of the connection device according to the invention provides that the basic parts on external sides of the basic parts that face away from each other have support structures with end-proximal functional faces for mounting and/or positioning on the functional modules, in particular in the region of the line ports. Especially this function can additionally be enhanced by a form-fitting snap-fit connection or a safeguard with a wedge (screw).

In a refinement of the connection device according to the invention it is very particularly advantageous for the connector pieces on the one end thereof to be connected in a force-fitting or form-fitting manner to the basic parts, preferably in that the basic parts have an assembly of snap-fit hooks which interact in a form-fitting manner with an end-proximal rim of a connector piece, preferably conjointly with an end-proximal flange of the sleeve element mentioned above;

the basic parts have an introduction structure into which an end-proximal rim of in each case one connector piece is introduced or introducible, preferably in the direction of the second axis mentioned above, said sliding insert interacting in a form-fitting manner with the end-proximal rim of a connector piece, preferably conjointly with an end-proximal flange of the sleeve element;

the connector pieces each have an end-proximal, optionally slotted rim, said rim by way of an interference fit being joined in a mating contour on a respective basic part and tilted in the direction of the joint such that the optionally slotted rim is elected in a reversal of the load and interlocks in a form-fitting and friction-fitting manner in the mating contour, said mating contour preferably being embodied in a plastics material, while the rim is preferably embodied so as to be metallic. If the rim is geometrically produced by a cutting process such as a stamping process, it is advantageous for the cutting burr to be oriented such that interlocking is facilitated.

In a refinement of the connection device according to the invention it can moreover be provided that the connector pieces on the other end thereof are connected, preferably in a materially integral manner, in particular by welding, to the branching element. A secure, fluid-tight and durable connection can be achieved in this way.

In a refinement of the functional modules that are temperature-controlled by means of a fluid it can finally also be provided that the connection assembly comprises at least two fluid lines, one for feeding and one for discharging the fluid, and the functional modules each have at least two line ports of which one is connected to the fluid line for feeding and one is connected to the fluid line for discharging the fluid. In this way, fresh temperature-control fluid can be fed to the functional modules while "consumed" or cooled or heated temperature-control fluid can be discharged from the functional modules so that a temperature-control circuit is able to be configured.

BRIEF DESCRIPTION OF THE DRAWINGS

Further properties and advantages of the invention are derived from the description hereunder of exemplary embodiments by means of the drawing in which.

DETAILED DESCRIPTION

In all the figures, the same reference signs identify identical or at least functionally equivalent elements.

Figure 1:
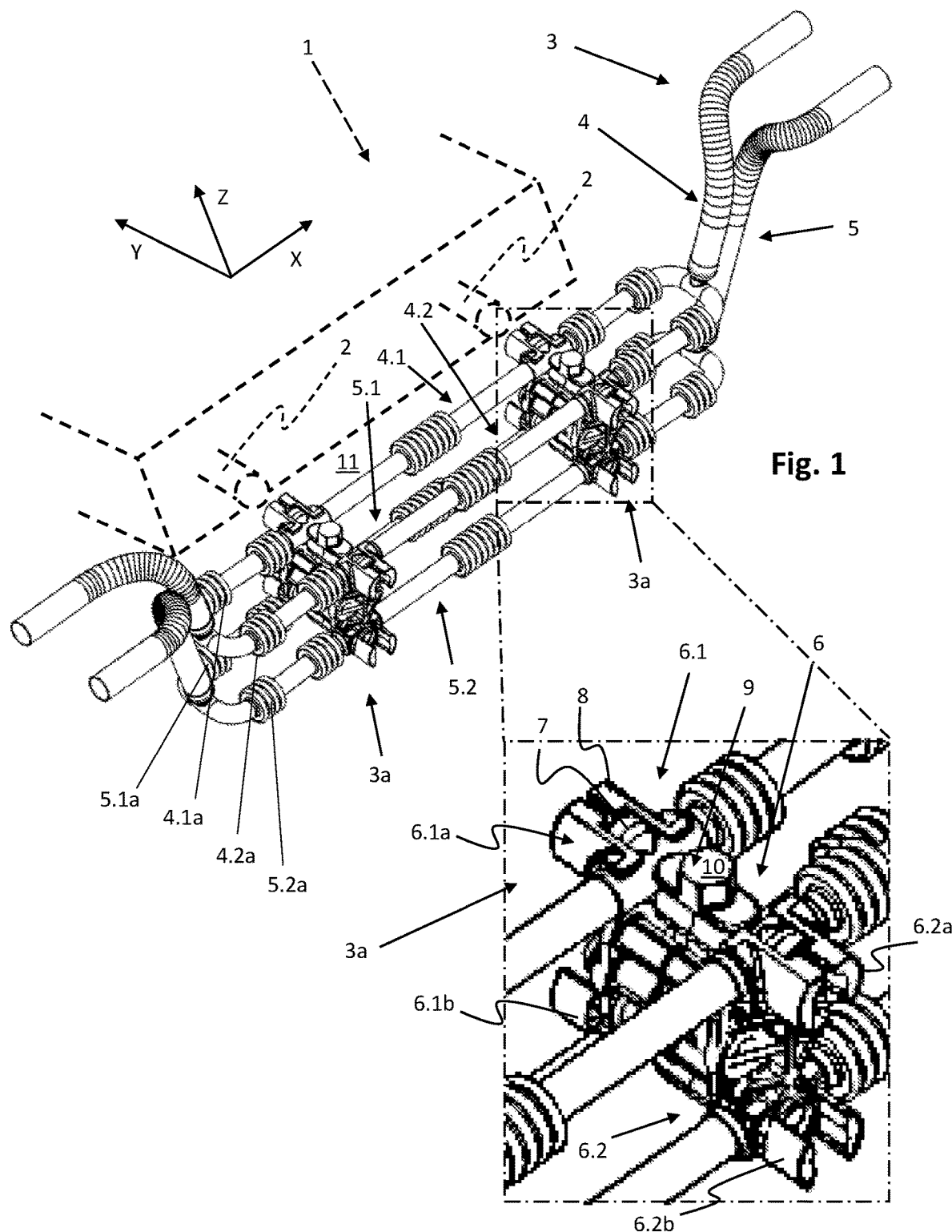
FIG. 1 shows a first design embodiment of the connection assembly according to the invention, having a connection device according to the invention.

Schematically illustrated at the reference sign 1 in FIG. 1 is a so-called functional module, said functional module potentially being in particular a battery cell, in particular for the electric drive of a motor vehicle. The functional module, or the battery cell 1, respectively, by way of example has two connector ports or line ports 2, respectively, which presently can serve for example for directing in a temperature-control fluid. The functional module 1 can have further line ports, in particular for directing the temperature-control fluid out. This is not illustrated for reasons of clarity in FIG. 1. Moreover, further (identical) functional modules 1 may be present.

Furthermore illustrated in FIG. 1 is a line assembly 3 which is composed of a plurality of individual component parts: in principle, there is firstly a first fluid line for feeding the temperature-control fluid, said first fluid line being provided with the reference sign 4. Furthermore, there is a second fluid line 5 for discharging the temperature-control fluid. The first fluid line 4 and the second fluid line 5 in a central region of the line assembly 3 have in each case two parallel-running strands 4.1, 4.2; 5.1, 5.2, said fluid lines 4, 5 in this region moreover having in each case a number of flexibly configured, corrugated line portions of which, for reasons of clarity, only a few are explicitly identified by the reference sign 4.1a, 4.2a; 5.1a, 5.2a in FIG. 1. The fluid lines 4, 5 are preferably embodied in a metallic material, preferably stainless steel.

Functional modules 1 are preferably disposed on both sides of the line assembly 3, this not being illustrated for reasons of clarity in FIG. 1.

The line assembly 3 moreover has two connection devices 3a having in each case one carrier module 6, reference in terms of the description of the latter being made to the detailed enlargement of one of the connection devices 3a contained in FIG. 1. The carrier modules 6 are preferably embodied in a plastics material. Each carrier module 6 comprises two basic parts 6.1, 6.2 which in the direction of the axis Y are movably connected to each other, in particular plugged into each other. Each of the basic parts 6.1, 6.2 here comprises two T-shaped connection pieces 6.1a, 6.1b; 6.2a, 6.2b, by way of which portions of the fluid lines 4, 5 are in each case fluidically connected to a connector piece 7 that extends in particular in the Y-direction, said connector pieces 7 preferably being configured as T-shaped castings including an internal seal (not shown) and each being welded or brazed/soldered to the first fluid line 4 or the second fluid line 5, or the parallel-running strands 4.1, 4.2; 5.1, 5.2 of said fluid lines 4, 5. For reasons of clarity, only one of the connector pieces 7 is explicitly identified in FIG. 1.

The connector pieces 7 are in each case disposed in particular in a leg 8 of the T-shaped connection pieces 6.1a, 6.1b; 6.2a, 6.2b, said leg 8 being configured in a (slotted) manner such that said leg 8 can be pushed onto one of the line ports 2. For this purpose, the connection devices 3a have in each case a cam-shaped element 9 with the aid of which the two basic parts 6.1, 6.2 can be diverged in the direction of the Y-axis, or counter to the latter, respectively, when an (automatic) operator activates a drive 10, in particular in the form of a hexagonal screwhead, present on the cam-shaped element 9 by way of a suitable tool. The connector pieces 7 then connect in a fluid-tight manner to the line ports 2, this to be discussed in more detail below. The flexible line portions 4.1a, 4.2a; 5.1a, 5.2a of the fluid lines 4, 5 ensure the required mobility in the Y-direction.

For assembling, the line assembly 3, preferably in the direction of the negative Z-axis, is incorporated in a region 11 between a plurality of functional modules 1 such that the legs 8, or the connector pieces 7, respectively, are aligned with the line ports 2 in the direction of the Y-axis. The drive 10, or the cam-shaped element 9, respectively, is then activated so as to connect the connector pieces 7 to the line ports 2. A spacing (in the Y-direction) between the connector pieces 7 is in particular modified in the process.

This results in a method for fluidically connecting functional modules 1 that are temperature-controlled by means of a fluid, in particular battery modules, in which method at least two functional modules 1 (of which only one is shown in FIG. 1) are disposed at a mutual spacing in such a manner that the respective line ports 2 are disposed so as to be substantially exactly opposite each other and aligned along a first axis, the latter being the Y-axis, and open into a region 11 between the functional modules 1. Thereafter, an at least partially flexible, preassembled connection assembly 3 is incorporated in the region 11 between the functional modules 1, said connection assembly 3 having at least one fluid line 4, 5 for feeding and/or discharging the fluid, and at least two fluidic connector pieces 7 which branch off from the fluid line, or each branch off from one of the fluid lines, in such a manner that the connector pieces 7 are in each case aligned with one of the line ports 2 along the first axis (Y), as is shown in FIG. 1 for the two line ports 2 illustrated. Subsequently, a spacing between the connector pieces 7 along the first axis (Y) is modified such that the connector pieces 7 each fluidically contact one of the line ports 2.

Figure 2:
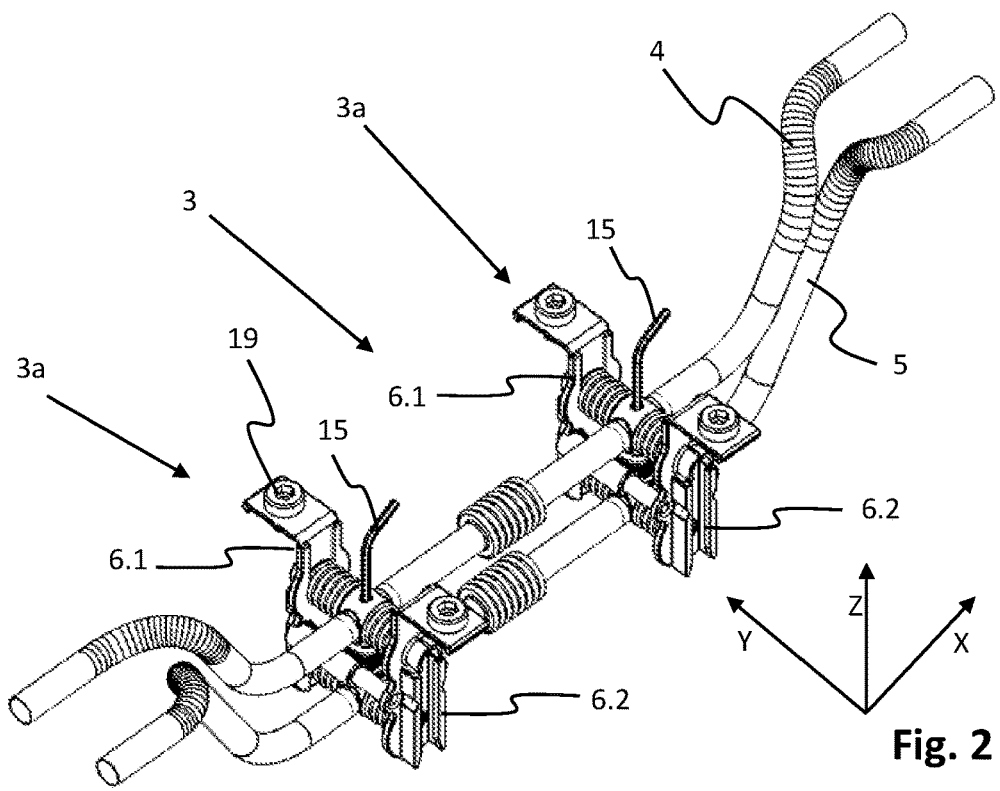
FIG. 2 shows a second design embodiment of the connection assembly according to the invention, having a connection device according to the invention.

Shown in FIG. 2 is an alternative design embodiment of the connection assembly 3; for reasons of clarity, an illustration of the functional modules 1 has been dispensed with. Only the substantial points of differentiation between the connection assembly 3 and the connection assembly from FIG. 1 will be discussed in more detail hereunder.

The fluid lines 4, 5 initially are not branched but at reference sign 12 have so-called branching elements of which two connector pieces 7 branch off in each case in the direction of the Y-axis. The connector pieces 7 here are preferably configured as metal bellows. As is derived in particular from the detailed illustration of one of the connection devices 3a in FIG. 3, a kinematic installation having a gear wheel 13 is disposed in the Z-direction between two branching elements 12, said gear wheel 13 engaging with two racks 14 which are oriented in the Y-direction and are in each case configured on one of the basic parts 6.1, 6.2, the latter being in a mirror-inverted configuration.

The racks 14 are configured so as to be hollow, in the form of sleeves, and in each of the basic parts 6.1, 6.2 in this way implement a guiding function for in each case one guide bar 14' which is disposed on the respective other basic part 6.1, 6.2 and is plugged into the rack 14. On the one hand, the basic parts 6.1 and 6.2 are mutually aligned and guided by means of these guide bars 14'. On the other hand, snap-fit connections or the like (not visible in the figure) that are preferably attached to the ends of the guide bars 14' ensure locking of the connection device 3a in a preassembled shipping state (having a compressed metal bellows or connector piece 7, respectively).

The branching elements 12 are preferably configured in a metallic casting material and (at least the upper branching element in the Z-direction) have a penetration 12*a* through which the gear wheel 13 can be activated by way of a suitable tool, here a hexagonal socket wrench 15, so as to diverge the basic parts 6.1, 6.2 in the Y-direction, as a result of which the connector pieces 7 can be elongated and brought to connect to the line ports (cf. FIG. 1). The connector pieces 7 are preferably connected in a materially integral manner to the branching elements 12. The branching elements 12 have connector ports 12*b* for the fluid lines 4, 5.

The basic parts 6.1, 6.2 on the external sides thereof have functional faces which configure an introduction ramp 16 and a guide 17 for pushing onto the line ports (cf. FIG. 1). The basic parts 6.1, 6.2 opposite the introduction ramp 16 have an outwardly directed angular offset 18 having a penetration 18*a*, the latter potentially serving for fixing to the functional modules, for example by means of a screw 19, cf. FIG. 2.

The gear wheel 13 in the design embodiment shown (cf. also FIG. 5 below), besides the driving function thereof, also assumes further functions: The entire connection device 3*a*, by a snap-fit hook connection or the like to the branching elements 12 disposed thereabove and therebelow, and by a support on the racks 14 by means of in each case one molded collar face 13*a* on the top and the bottom, is stabilized and conjointly with the angular offsets 18 forms a supporting function for the fluid lines 4, 5.

The connector pieces 7 have an end-proximal rim 7*a* by way of which the former are held in a form-fitting manner in a respective associated insert 6*a*, the latter being configured on the basic parts 6.1, 6.2.

The basic parts 6.1, 6.2 at the reference sign 8' have slotted protrusions, the function of the latter corresponding to that of the legs 8 described above. The protrusions 8' open in the direction of the guides 17 such that the line ports (cf. FIG. 1) can be introduced into the protrusions 8' and received within the protrusions 8' (cf. also FIG. 8).

Figure 3:
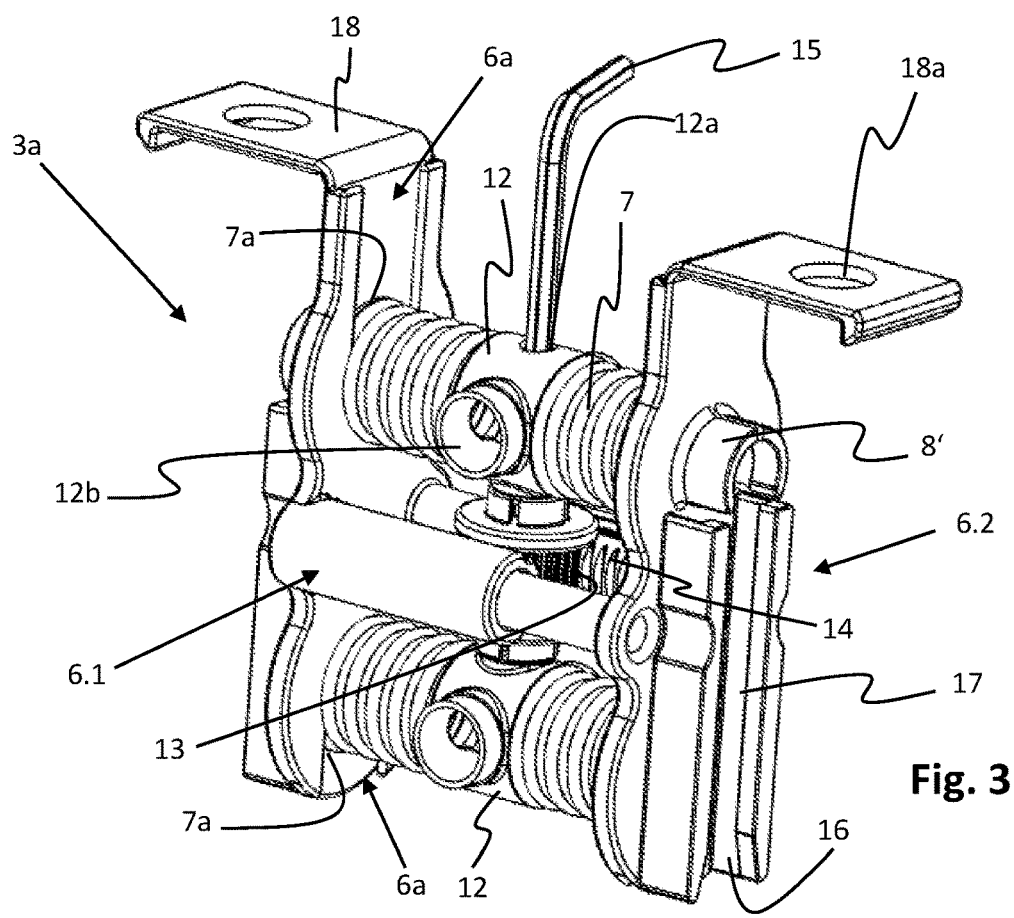
FIG. 3 shows a connection device according to FIG. 2 in detail.

FIGS. 2 and 3 thus illustrate a method for fluidically connecting functional modules that are temperature-controlled by means of a fluid, in particular battery modules, in which method it is achieved that the connector pieces 7 by modifying a length of the connector pieces 7 along the first axis (Y) fluidically contact in each case one of the line ports 2 (cf. FIG. 1).

Figure 4:
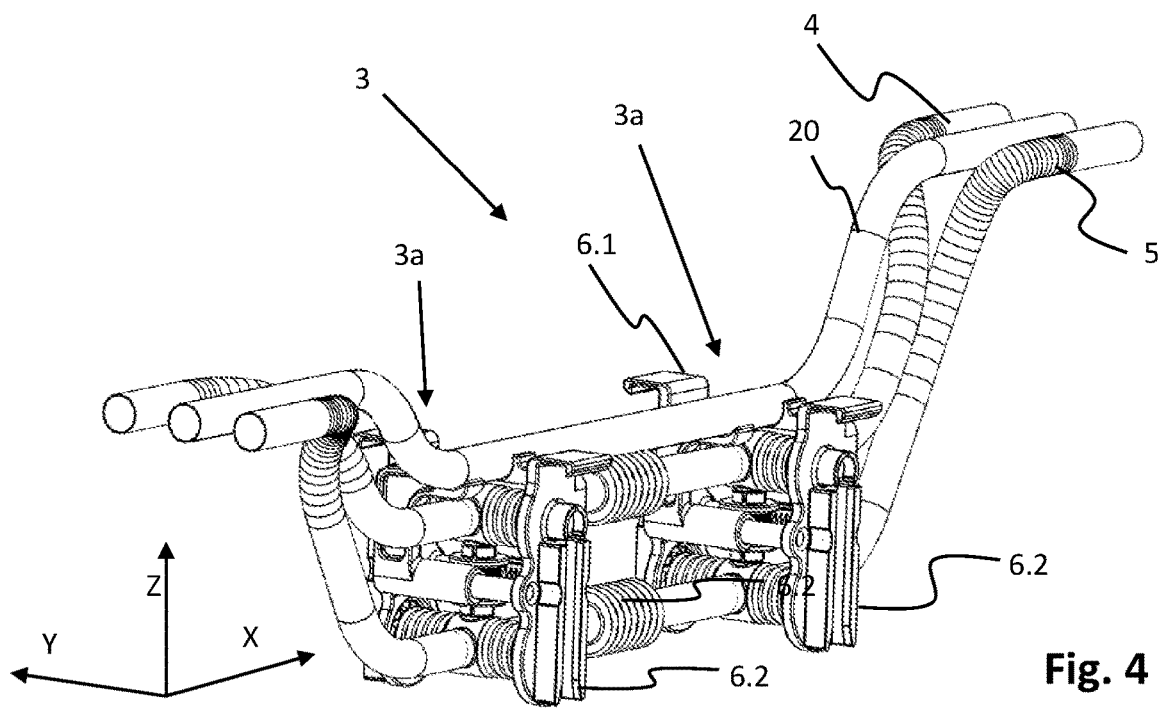
FIG. 4 shows a third design embodiment of the connection assembly according to the invention, having a connection device according to the invention.
Figure 5:
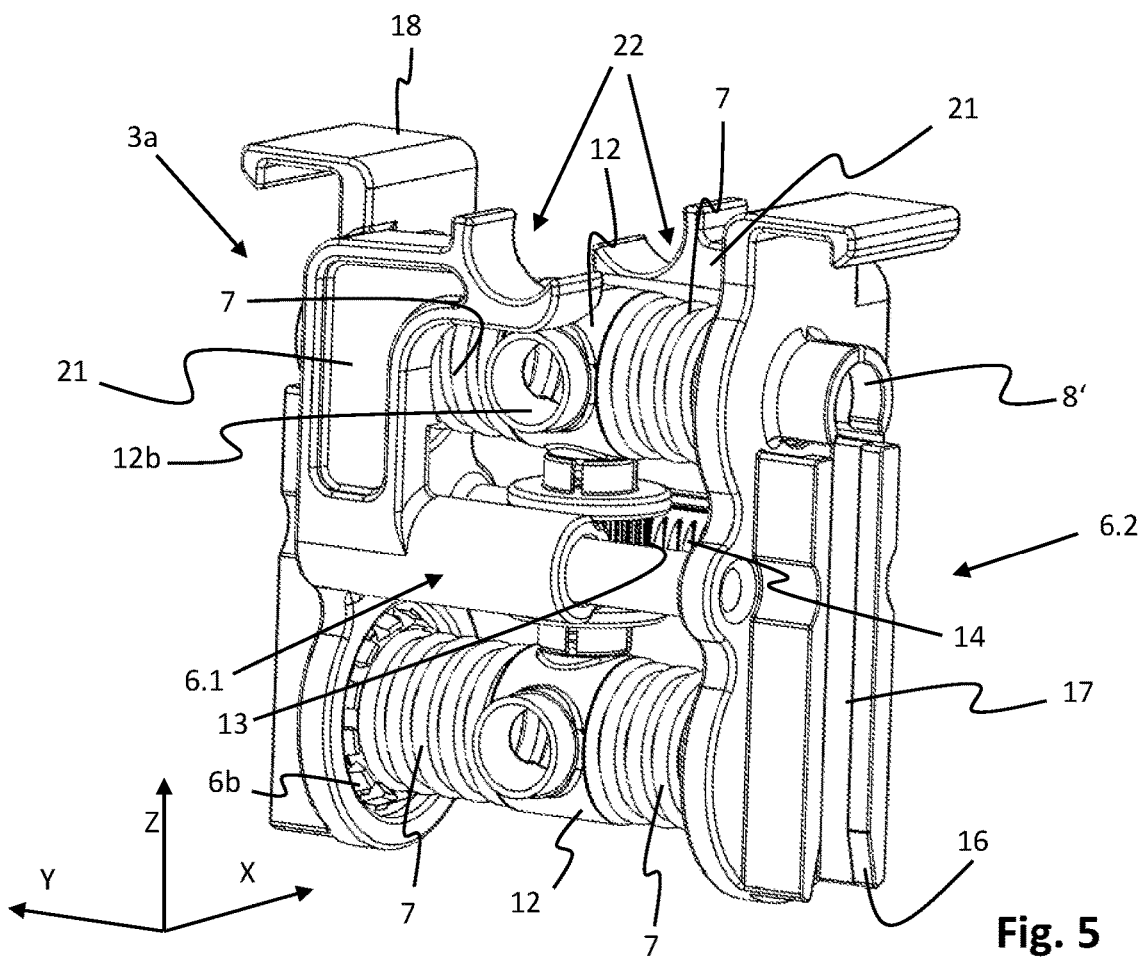
FIG. 5 shows a connection device according to FIG. 4 in detail.

A design embodiment which has a slight variance in comparison to that of FIGS. 2 and 3 is shown in FIGS. 4 and 5. Only the substantial points of differentiation will be discussed in more detail.

A further fluid line 20 which is mounted by holding arms 21 is illustrated in FIG. 4, said holding arms 21 having bearing shells 22 for the further fluid line 20, said bearing shells 22 being in alignment when the basic parts 6.1, 6.2 are situated in the assembled state in which said basic parts 6.1, 6.2 are remote from each other. The further fluid line 20 can function as a safeguarding installation in the Z-direction.

A further point of differentiation between FIGS. 4 and 5 in comparison to FIGS. 2 and 3 lies in the fixing of the connector pieces 7 to the basic parts 6.1, 6.2. For this purpose, the basic parts 6.1, 6.2 have a number of snap-fit hooks 6*b*, the latter yet to be discussed in more detail below by means of FIGS. 13 and 14.

In order for the connector pieces 7 to be connected to the line ports (cf. FIG. 1), one proceeds in a manner analogous to that of FIGS. 2 and 3. Subsequently, the further fluid line 20 is inserted or clipped into the bearing shells 22. Said further fluid line can serve as an assembly safeguard.

Figure 6:
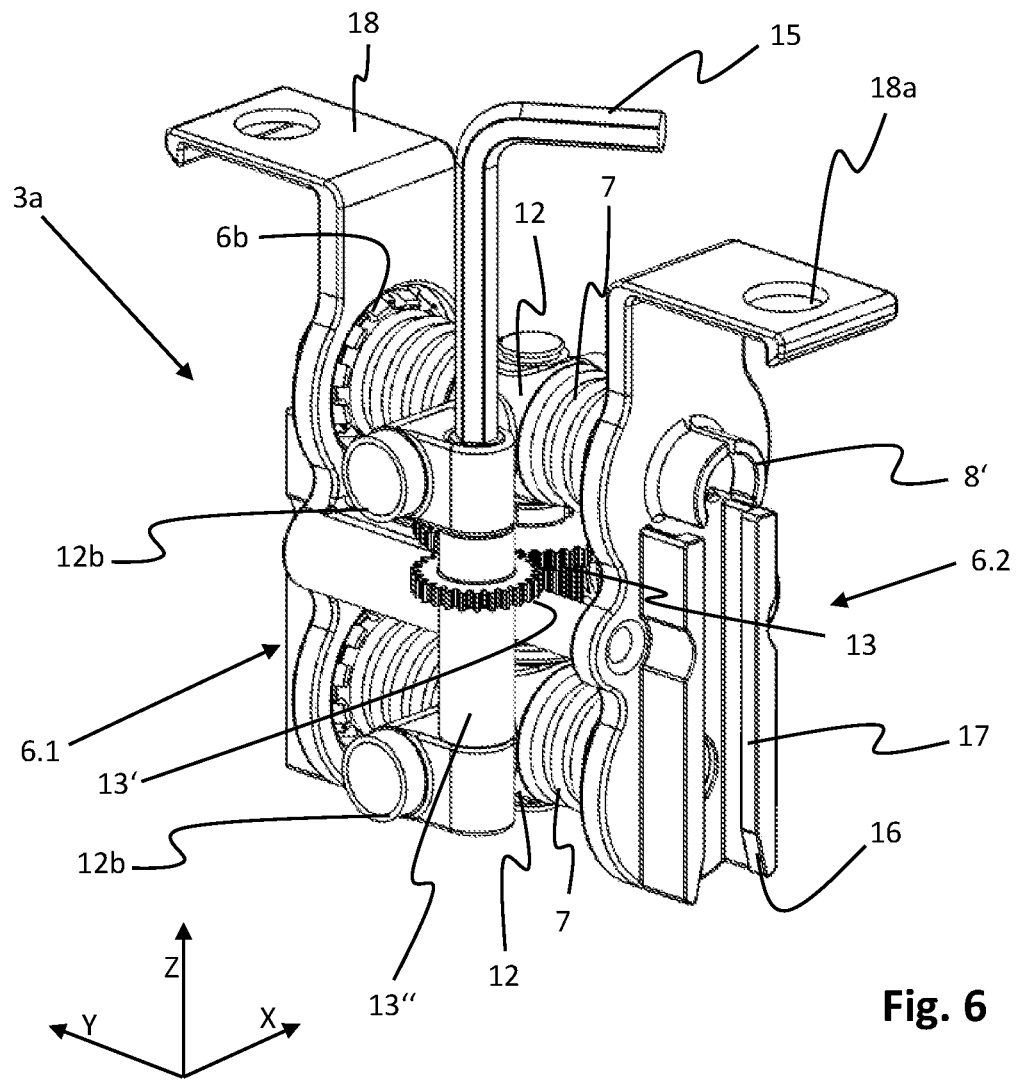
FIG. 6 shows a variant of the connection device according to FIG. 4 and FIG. 5.

A refinement of the design embodiment according to FIGS. 2 to 5 is illustrated in FIG. 6. The kinematic installation here comprises a further gear wheel 13' which is disposed on a layshaft 13" such that the tool 15 no longer has to be introduced while penetrating the branching element 12. Moreover, a desired positive (or negative) gearing ratio can be implemented in this way when the gear wheels 13, 13' are suitably adapted to each other. The layshaft 13" is preferably mounted on the connector ports 12*b* in the manner shown.

The fixing of the connector pieces 7 to the basic parts 6.1, 6.2 in the design embodiment according to FIG. 6, in a manner analogous to that of the design embodiment according to FIGS. 4 and 5, is performed by way of snap-fit hooks 6*b*.

Figure 7:
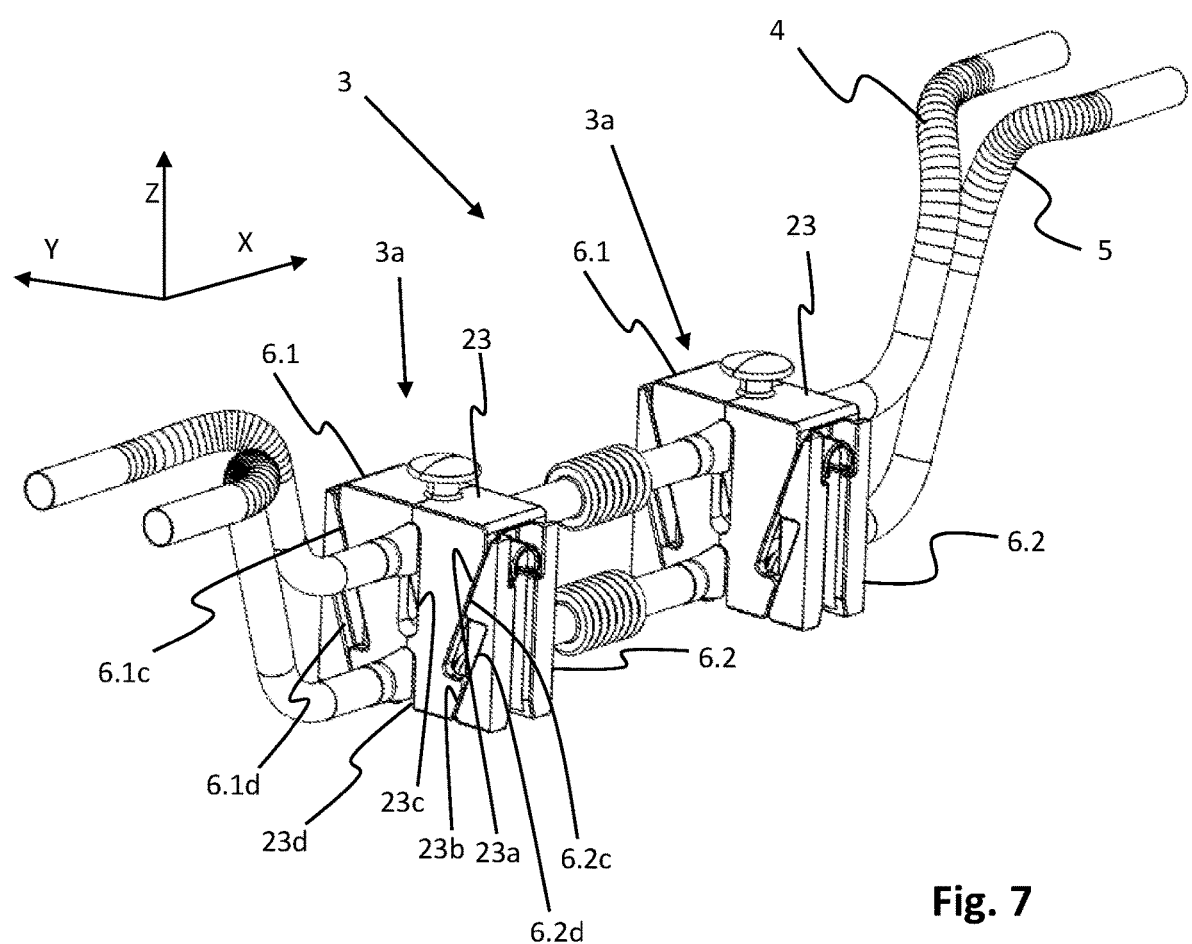
FIG. 7 shows a fourth design embodiment of the connection assembly according to the invention, having a connection device according to the invention.

A fundamentally different design embodiment of the connection devices 3*a* is shown in FIG. 7. While the design embodiment and the disposal of the fluid lines 4, 5 fundamentally correspond to that of FIG. 2, the action on the connector pieces (not visible in FIG. 7) is not performed by means of a gear wheel and a rack, as in the design embodiments according to FIGS. 2 to 5, but by way of a (double) wedge-shaped element 23 which is inserted between the (invisible) connector pieces, or between the basic parts 6.1, 6.2, respectively, along the second axis (Z-direction), so as to in this way diverge the basic parts 6.1, 6.2 in the direction of the Y axis and to ensure an elongation of the connector pieces, said connector pieces potentially being fixed to/in the basic parts 6.1, 6.2 fundamentally according to the design embodiment in FIG. 3 or the design embodiment in FIG. 5.

Specifically, the wedge-shaped element 23 has two ramps 23*a* and 23*b* which in each case interact with complementary ramps 6.1*c/d*, 6.2*c/d* on the basic parts 6.1, 6.2. The wedge-shaped element 23 moreover has two clearances 23*c*, 23*d* which enable the fluid lines 4, 5 to pass through. One of the clearances 23*c* is configured as an elongate bore, so as to enable a movement of the wedge-shaped element 23 in the Z-direction. As is illustrated, the fluid lines 4, 5 in this region can be configured so as to be flattened and so as to correspond to a shape of the clearances 23*c*, 23*d*.

The lowered position of the wedge-shaped elements 23 is shown in FIG. 7, in which lowered position the connector pieces for contacting the line ports are deformed (elongated) in the +/−Y-direction (cf. FIG. 1).

The basic parts 6.1, 6.2 on the external sides thereof are preferably designed (introduction ramp 16, guide 17, . . . ) as has been described in detail above by means of FIG. 3, reference being made thereto.

Figure 8:
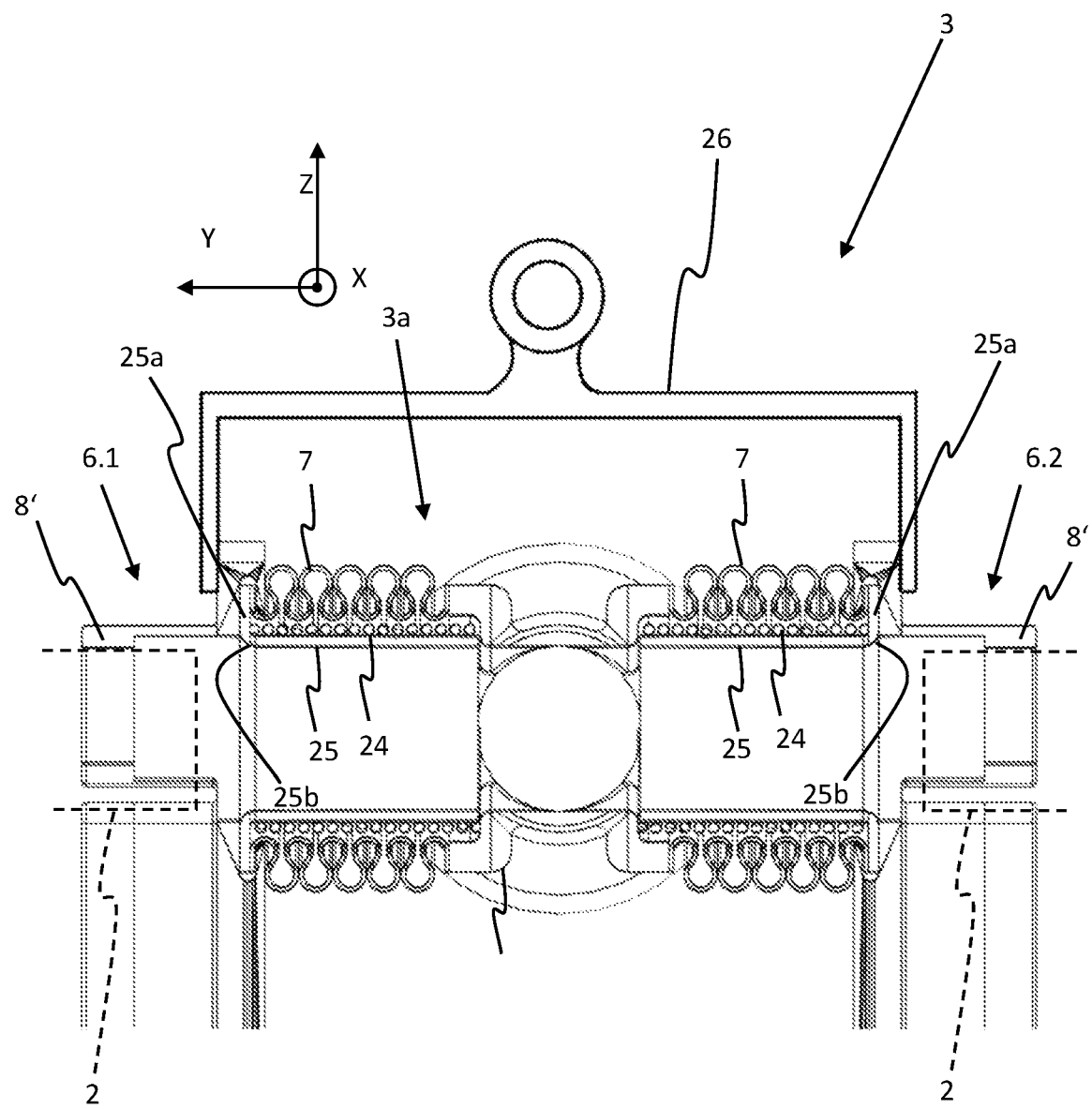
FIG. 8 shows a fifth design embodiment of the connection assembly according to the invention, having a connection device according to the invention.

A partial cross section through a further design embodiment in which the bellows-type connector pieces 7 radially on the inside are in each case provided with one spring element 24 and one sleeve element 25 is shown in FIG. 8. The spring element 24 is preferably a coil spring. The sleeve element 25 has an end-proximal rim or flange 25*a*. The connector pieces 7 on the inside are connected to the branching element 12 and on the outside are connected (in a materially integral manner) to the rim 25*a*.

Shown in FIG. 8 is a compressed state of the connector pieces 7, said compressed state being maintained by means of a suitable holding tool 26, said tool engaging on suitable protrusions of the basic parts 6.1, 6.2. The spring elements 24 are supported on the branching element 12, on the one hand, and on the rim 25*a*, on the other hand. If the tool 26 is removed, the spring elements 24 press the sleeve elements 25 toward the outside and in this way elongate the connector pieces 7 until a (fluid-tight) connection to the line port 2 of the functional modules is established (said line port 2 being only schematically illustrated (by dashed lines)). The fluid-tight connection here is not performed directly by the connector pieces 7 per se but in the region of the sleeve elements 25 which in the region of the angular offset of the rim configure a suitable introduction ramp (introduction radius) 25*b*.

As is also the case in the other design embodiments of the present invention, a plastic deformation (elongation) of the connector pieces 7 advantageously arises in the process. To this end, said connector pieces 7 can have a correspondingly suitable corrugation (deformation corrugation).

However, the invention is not limited in this context; this applies in particular also in terms of the specific design embodiment of the spring element 24.

Figure 9:
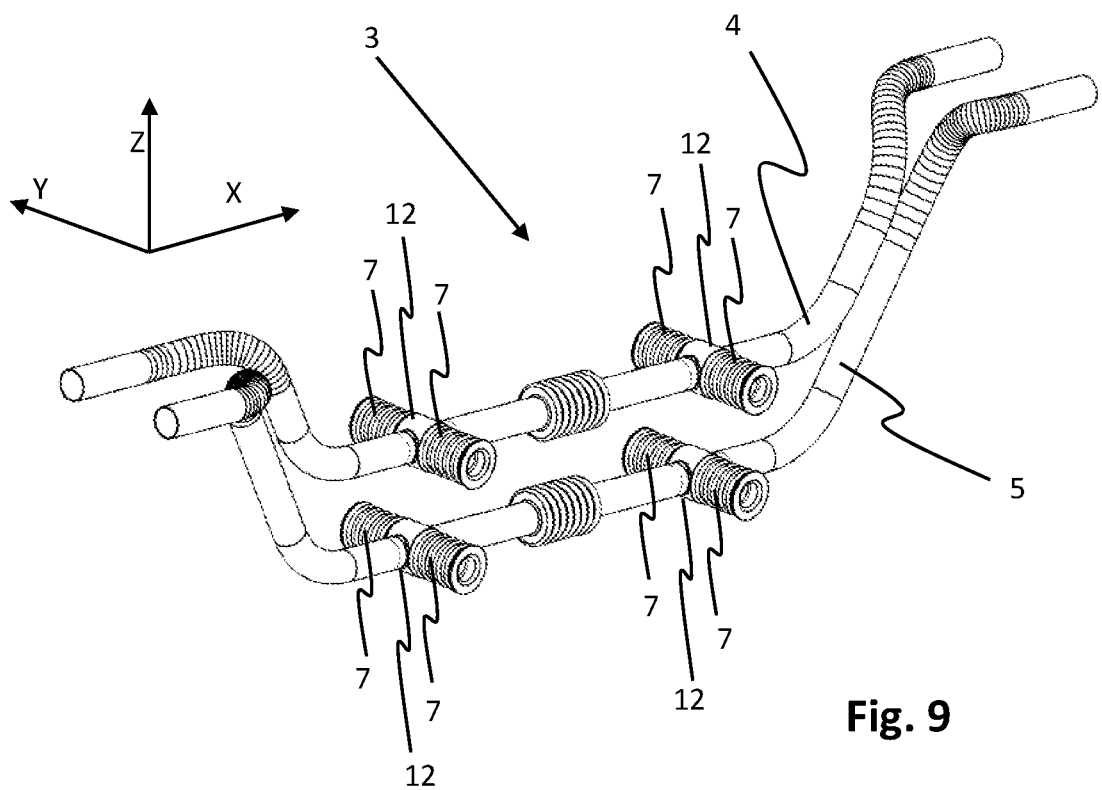
FIG. 9 shows a sixth design embodiment of the connection assembly according to the invention.
Figure 10:
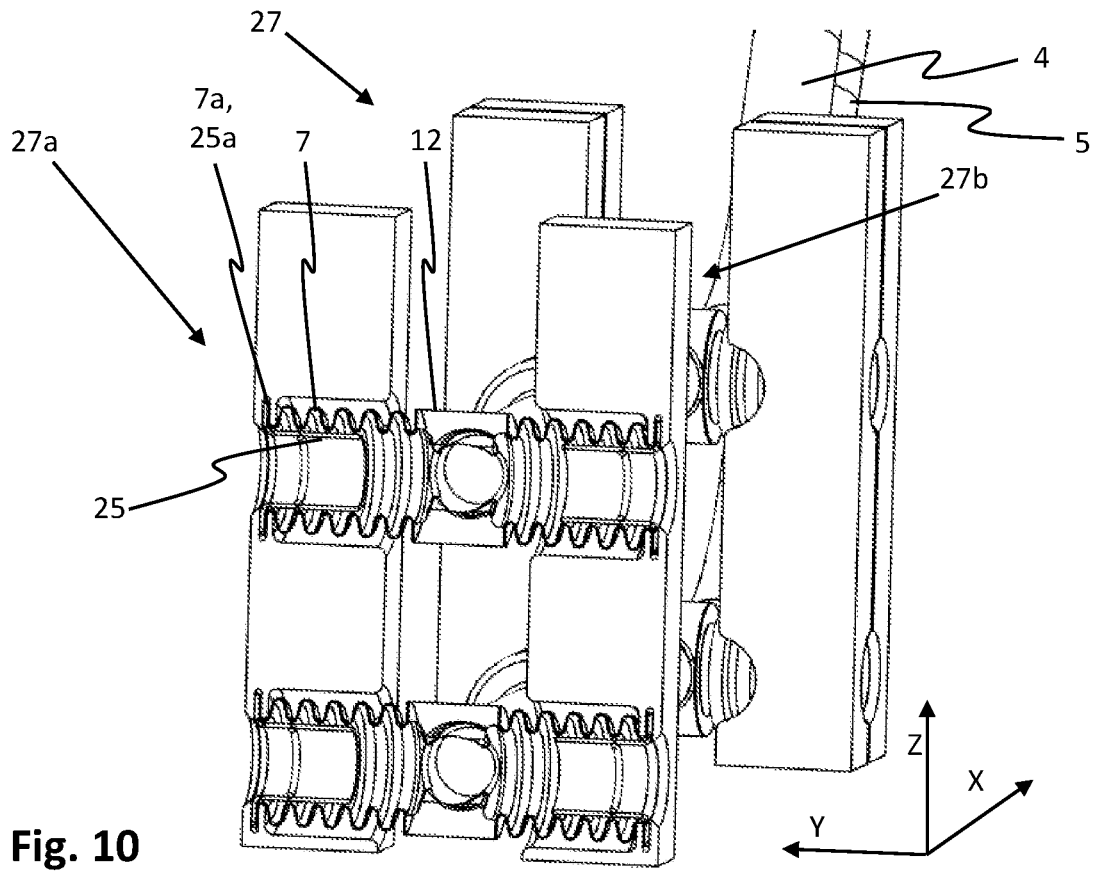
FIG. 10 shows the connection assembly from FIG. 9 including an associated (assembly) tool.

A variant of the design embodiment according to FIG. 8 which entirely dispenses with carrier modules/basic parts is shown in FIGS. 9 and 10. The connection assembly 3 shown in FIG. 9 has the fluid lines 4, 5, which have already been mentioned multiple times, having branching elements 12 and connector pieces 7 branching off from the latter. Now shown in FIG. 10 is moreover a suitable (gripping) tool 27 which grips the connector pieces 7 such that the latter in the region of the end-proximal rims 7*a* are held in a form-fitting manner and are able to be compressed by moving tool halves 27*a*, 27*b* inward along the Y-axis. The tool halves 27*a*, 27*b* mentioned in turn are divisible in the direction of the X-axis so as to release the connector pieces 7 again such that the latter are relaxed and able to be connected to the line ports 2 in a manner analogous to that of the design embodiment in FIG. 8 (cf. FIG. 8).

Implemented in this way can be a method in which, for compressing the connector pieces 7 and for incorporating the connection assembly 3, is provided a tool 27 which
preferably first grips the connection assembly 3;
compresses the connector pieces 7;
positions the connection assembly 3, preferably including a compensation of tolerances by way of flexible line elements in the connection assembly 3;
relaxes the connector pieces 7 and preferably additionally plastically forms the latter when contacting the line ports 2 (by traveling outward in the direction of the Y-axis);
permits the connector pieces 7 to rebound to a state which, except for inherent stresses and the stresses remaining as a result of potential friction of sealing elements, is non-stressed; and
subsequently releases the connection assembly 3.

Provided for this purpose also in the design embodiment according to FIGS. 9 and 10 is in each case a sleeve element 25, as has been described in detail above by means of FIG. 8. The end-proximal rims 25*a* of the sleeve elements 25 extend so as to be parallel to the mentioned rims 7*a* of the connector pieces 7.

Finally, different possibilities of fixing the connector pieces 7 to the basic parts 6.1, 6.2 are again illustrated in FIGS. 11 to 14, some of these possibilities having already been mentioned above.

Figure 11:
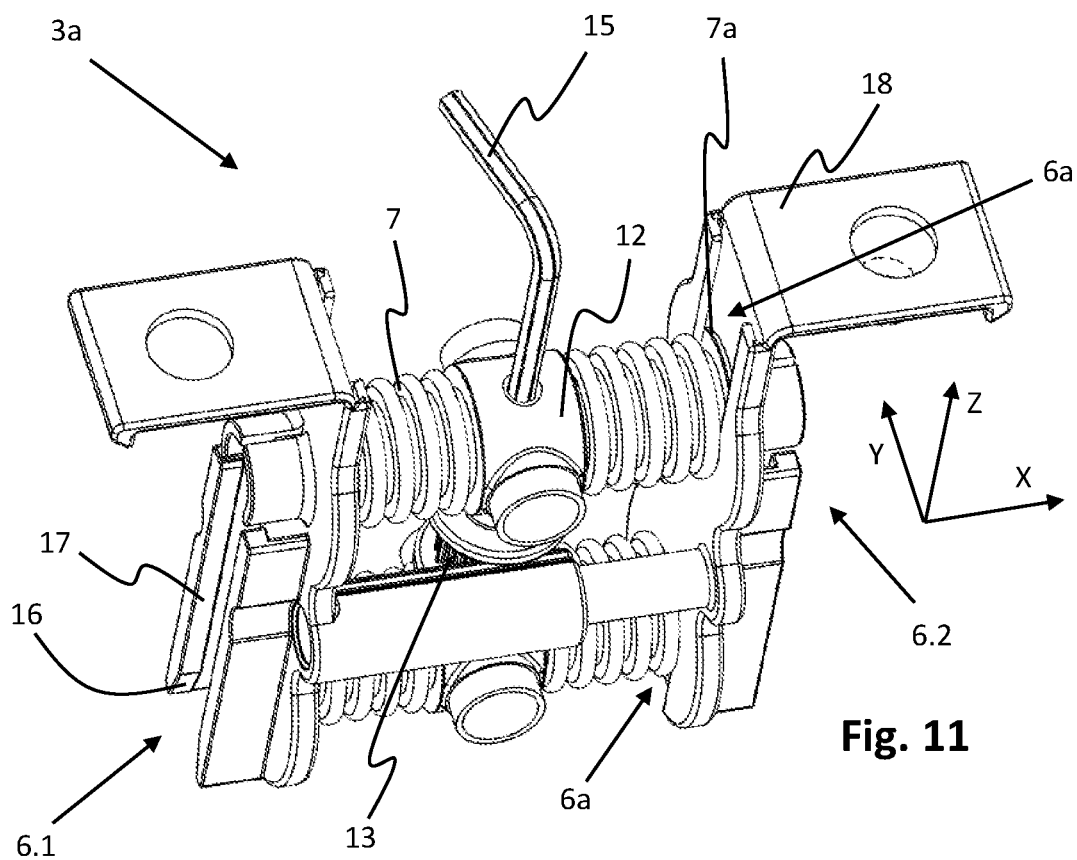
FIG. 11 shows a detail of a further design embodiment of the connection assembly according to the invention.

FIG. 11 shows a design embodiment analogous to that of FIG. 3, in which the connector pieces 7 by way of the end-proximal rim 7*a* thereof are inserted into a corresponding receptacle (insert) 6*a* on the basic parts 6.1, 6.2 and held in a form-fitting manner therein.

Figure 12:
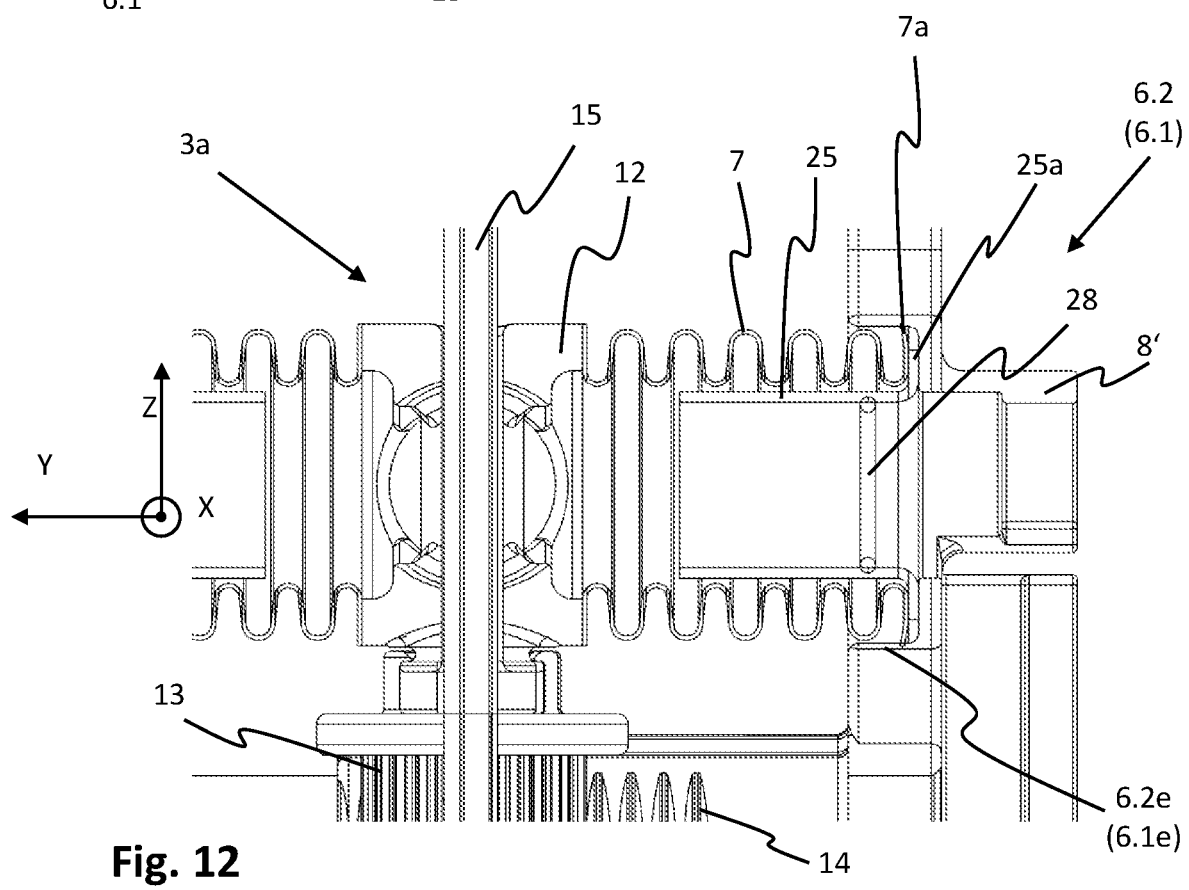
FIG. 12 shows a detail of another design embodiment of the connection assembly according to the invention.

A design embodiment having a so-called "claw" is illustrated in FIG. 12: The connector pieces 7 (again) have an end-proximal rim 7*a*, said rim 7*a* by way of an interference fit being joined in a mating contour 6.1*e*, 6.2*e* of the basic part 6.1, 6.2 and being tilted in the direction of the joint. In the case of a load reversal, the optionally slotted rim 7*a* is erected and interlocks in a form-fitting and friction-fitting (force-fitting) manner in the mating contour 6.1*e*, 6.2*e*, as is shown. The mating contour 6.1*e*, 6.2*e* is preferably embodied in a plastics material and the rim 7*a* is preferably embodied so as to be metallic. If the rim 7*a* is geometrically produced by a cutting process such as a stamping process, it is advantageous for the cutting burr to be oriented such that interlocking is supported and a particularly advantageous design embodiment thus results.

As is also derived from FIG. 12, a sealing element (annular seal, O-ring) 28 can be present in the region of the sleeve element 25 so as to improve the fluid-tight connection to the line ports (not shown here).

Figure 13:
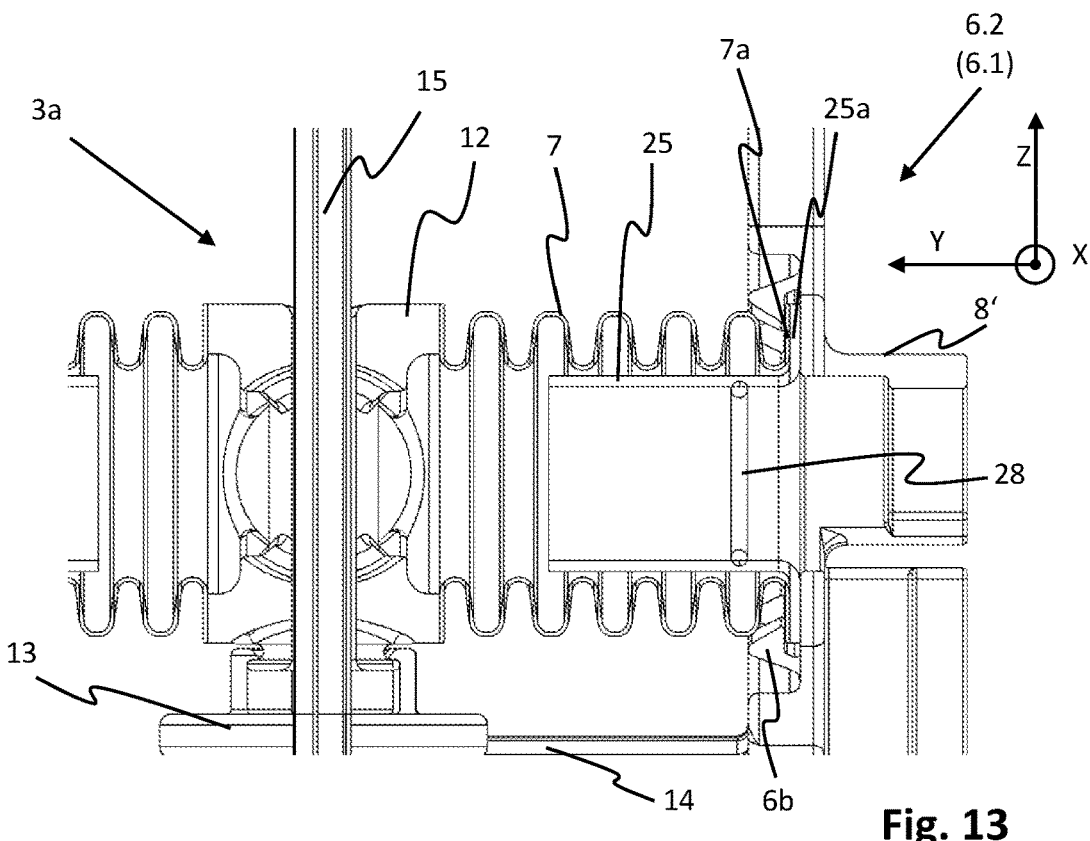
FIG. 13 shows a detail of yet another design embodiment of the connection assembly according to the invention.

According to FIG. 13, the connection of connector pieces 7 (and sleeve elements 15) is performed by way of snap-fit hooks 6*b*, as has already been described above.

Figure 14:
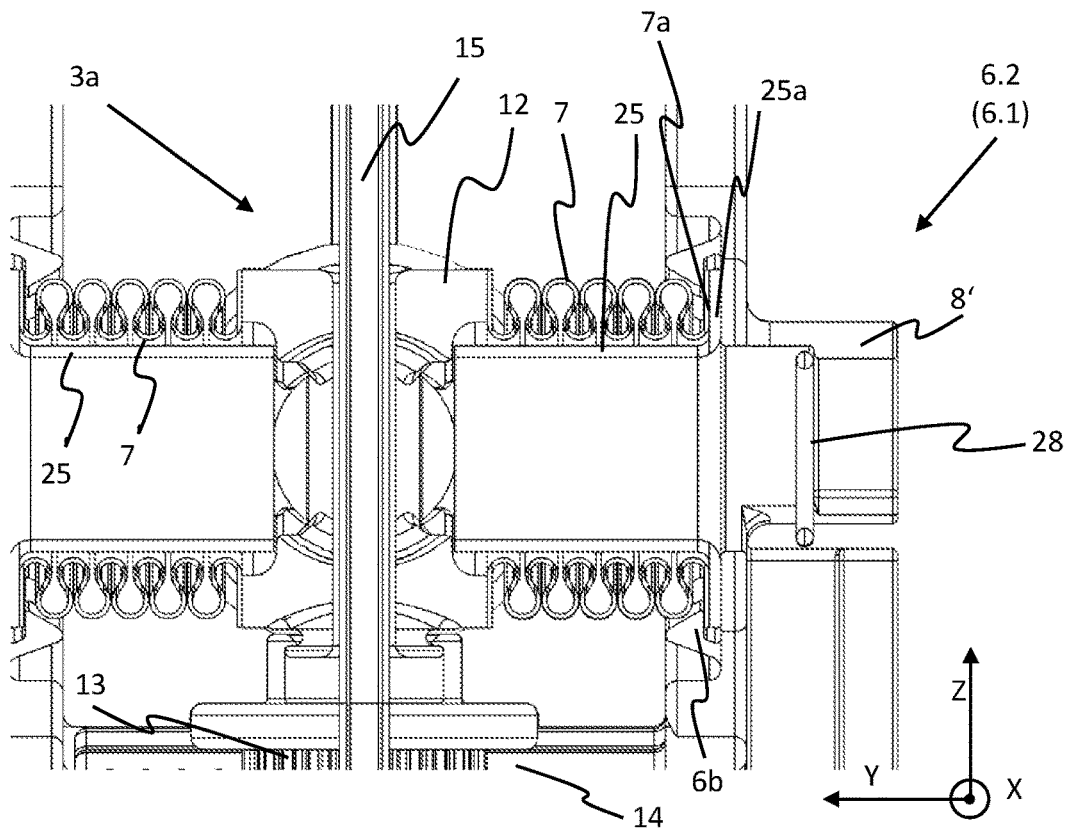
FIG. 14 shows a detail of yet another design embodiment of the connection assembly according to the invention.

A variant of embodiment (likewise having snap-fit hooks 6*b*), in which the sealing element 28 is not disposed in the region of the sleeve element 25 but in the region of the element at the reference sign 8', is shown in FIG. 14.

A comparison between FIG. 13 and FIG. 14 clearly shows the difference between the elongated state of the connector pieces 7 (FIG. 13) and the initial state (FIG. 14) before the connector pieces 7 are elongated in the direction of the Y-axis.

As the person skilled in the art will easily recognize, the fixing possibilities for the connector pieces 7 according to FIGS. 11 to 14 can fundamentally be used in all design embodiments of the invention, either in an arbitrary manner or depending on the requirements, with the exception of only the design embodiment according to FIGS. 9 and 10, in which no basic parts are used so that corresponding fixing of the connector pieces 7 is not required.

The invention claimed is:

1. A method for fluidically connecting functional modules that are temperature-controlled by a fluid, said method comprising the following steps:
a) providing the functional modules, said functional modules each having at least one line port for directing the fluid at least one of in or out;
b) disposing at least two of the functional modules at a mutual spacing such that the respective line ports are disposed so as to be substantially opposite each other and aligned along a first axis and open into a region between the functional modules;
c) incorporating an at least partially flexible, preassembled connection assembly in the region between the at least two of the functional modules, said connection assembly having at least one fluid line for at least one of feeding or discharging the fluid, and at least two fluidic connector pieces which branch off from the fluid line or each branch off from one of the fluid lines such that the connector pieces are in each case aligned with one of the line ports along the first axis; and
d) modifying at least one of a spacing between the connector pieces or a length of the connector pieces along the first axis using a kinematic installation disposed on a carrier module such that the connector pieces each fluidically contact one of the line ports so as to fluidically connect the connector pieces to respective ones of the line ports;
wherein the connection assembly comprises at least two of the fluid lines, one for feeding the fluid and one for discharging the fluid, and the functional modules have in each case at least two of said line ports, and the method includes connecting one said line port to the fluid line for feeding the fluid, and connecting one said line port to the fluid line for discharging the fluid.

2. The method as claimed in claim 1, wherein the connection assembly is incorporated in the region along a second axis that is transverse to the first axis.

3. The method as claimed in claim 1, wherein for modifying the at least one of the spacing or the length in step d) there is a spacing modification installation which is activated from outside the region, the activation including a translatory movement along a second axis that is transverse to the first axis, or a rotating movement about the second axis.

4. The method as claimed in claim 3, wherein in step d) the spacing between the connector pieces is modified by
d1) rotating a cam-shaped element disposed between the connector pieces about the second axis between the connector pieces; or
d2) inserting a wedge-shaped element along the second axis between the connector pieces; or
d3) activating a spacing-modifying gear assembly.

5. The method as claimed in claim 3, wherein in step d) the length of the connector pieces is modified by
d4) inserting a length-modifying wedge-shaped element along the second axis into the region between the functional modules; or
d5) activating a length-modifying gear assembly; or
d6) prior to step c) first compressing the connector pieces, and in step d) allowing the connector pieces to relax again.

6. The method as claimed in claim 5, further comprising:
providing a tool for compressing the connector pieces and for incorporating the connection assembly, said tool
compresses the connector pieces;
positions the connection assembly, including a compensation of tolerances by way of flexible line elements in the connection assembly;
relaxes the connector pieces and additionally plastically deforms the connector pieces when contacting the line ports; and
permits the connector pieces to rebound to a state which, except for inherent stresses and stresses remaining as a result of potential friction of sealing elements, is non-stressed.

7. The method as claimed in claim 1, wherein in step d) the length of the connector pieces is plastically modified.

8. A connection device for fluidically connecting functional modules that are temperature-controlled by a fluid, said functional modules each having at least one line port for directing the fluid at least one of in or out, the connection device comprising:
a carrier module for mounting at least one fluid line for at least one of feeding or discharging the fluid;
at least two fluidic connector pieces which by way of the carrier module are fluidically connectable to the fluid line or to in each case one of the fluid lines; and
a kinematic installation which is disposed on the carrier module and configured to modify at least one of a spacing between the connector pieces or a length of the connector pieces upon activation of said kinematic installation, so as to fluidically connect the connector pieces to respective ones of the line ports;
wherein the carrier module has two basic parts which are movably connected to each other and respectively hold or receive one of the connector pieces, and
the kinematic installation comprises a cam-shaped element which is disposed between at least one of the connector pieces or the basic parts, said cam-shaped element being mounted on the carrier module for rotation about a second axis such that the modification of the spacing between the connector pieces is able to be effected by way of a rotation of the cam-shaped element.

9. The connection device as claimed in claim 8, wherein the connector pieces are aligned along a first axis and the kinematic installation is configured to modify the at least one of the spacing between the connector pieces or the length of the connector pieces along the first axis.

10. The connection device as claimed in claim 9, wherein the first axis is oriented substantially transverse to a direction of extent of the one fluid line.

11. The connection device as claimed in claim 8, wherein the connector pieces are configured as flexible metal bellows having a corrugated portion or comprise metal bellows, with said metal bellows being mechanically pretensioned.

12. The connection device as claimed in claim 8, wherein the connector pieces comprise a sleeve element which is configured and provided for a fluidic connection to a line port and including an introduction ramp or an introduction radius.

13. The connection device as claimed in claim 8, wherein the basic parts each have at least one connector for the at least one fluid line, each said connector being fluidically connected to the respective connector piece.

14. The connection device as claimed in claim 8, wherein the basic parts are equipped with functional faces for form-fitting reception of further lines or pipes, said functional faces being divided into sub-faces on the respective basic parts to permit the further lines or pipes to be received only by said basic parts when joined and correctly assembled.

15. The connection device as claimed in claim 8, wherein the basic parts include, on external sides thereof that face away from each other, support structures with end-proximal functional faces for at least one of mounting or positioning on the functional modules in a region of the line ports.

16. An arrangement of functional modules that are temperature-controlled by a fluid, the arrangement comprising:
said functional modules each including at least one line port for directing the fluid at least one of in or out;
a connection assembly including at least one connection device having
a carrier module for mounting at least one fluid line for at least one of feeding or discharging the fluid,
at least two fluidic connector pieces which by way of the carrier module are fluidically connectable to the fluid line or to in each case one of the fluid lines,
a kinematic installation which is disposed on the carrier module and configured to modify at least one of a spacing between the connector pieces or a length of the connector pieces upon activation of said kinematic installation, so as to fluidically connect the connector pieces to respective ones of the line ports, and
at least one said fluid line for at least one of feeding or discharging the fluid, said fluid line being fluidically connected to the connector pieces by way of the carrier module;
at least two of the functional modules being disposed at a mutual spacing such that the respective line ports are disposed so as to be substantially opposite each other and aligned along a first axis and open into a region between the functional modules;
the line ports being fluidically connected to the fluid line by the connection device;
wherein the connection assembly comprises at least two of the fluid lines, one for feeding the fluid and one for discharging the fluid, and the functional modules have in each case at least two of said line ports of which one said line port is connected to the fluid line for feeding the fluid, and one said line port is connected to the fluid line for discharging the fluid.

17. The arrangement of functional modules that are temperature-controlled by a fluid as claimed in claim 16, wherein the carrier module has at least two basic parts which are movably connected to each other and respectively hold or receive one of the connector pieces, as well as a branching element which is disposed between at least one of the connector pieces or the basic parts, said branching element fluidically connecting the connector pieces to each other, and the kinematic installation comprises a gear assembly, and the modification of the length of the connector pieces is adapted to be effected by activating said gear assembly such that the basic parts are diverged.

18. The arrangement of functional modules that are temperature-controlled by a fluid as claimed in claim 17, wherein the gear assembly has at least one first gear wheel and at least one rack which engages with the first gear wheel, said first gear wheel being rotatable about a second axis while the rack is oriented so as to be parallel to the connector pieces.

19. The arrangement of functional modules that are temperature-controlled by a fluid as claimed in claim 18, wherein the gear assembly is activatable while penetrating the branching element.

20. The arrangement of functional modules that are temperature-controlled by a fluid as claimed in claim 18, wherein the gear assembly additionally has at least one second gear wheel, said second gear wheel engaging with the first gear wheel.

21. The connection device as claimed in claim 17, wherein the connector pieces on one end thereof are connected in a force-fitting or form-fitting manner to the basic parts, and
- the basic parts have an assembly of snap-fit hooks which interact with a form-fit with an end-proximal rim of one said connector piece; or
- the basic parts have an introduction structure into which an end-proximal rim of one said connector piece is introduced or adapted to be introduced, said introduction structure interacting with a form-fit with the end-proximal rim of said connector piece; or
- the connector pieces each have an end-proximal rim, said rim being joined in a mating contour on a respective basic part by an interference fit.

22. The connection device as claimed in claim 21, wherein the connector pieces on an opposite end thereof are connected to the branching element.

23. The arrangement of functional modules that are temperature-controlled by a fluid as claimed in claim 16 wherein the carrier module has two basic parts which are movably connected to each other and respectively hold or receive one of the connector pieces, and
- the kinematic installation comprises a wedge-shaped element which is disposed between at least one of the connector pieces or the basic parts, said wedge-shaped element being mounted on the carrier module for movement along a second axis such that the modification of the spacing between the connector pieces is able to be effected by way of a movement of the wedge-shaped element.

* * * * *